United States Patent
Makke et al.

(10) Patent No.: US 12,111,948 B2
(45) Date of Patent: Oct. 8, 2024

(54) PRIVACY AWARE MULTI CHANNEL DATA TRANSFER

(71) Applicant: FORD GLOBAL TECHNOLOGIES, LLC, Dearborn, MI (US)

(72) Inventors: Omar Makke, Lyon Township, MI (US); Oleg Gusikhin, Commerce Township, MI (US); Basavaraj Tonshal, Northville, MI (US); Panduranga Chary Kondoju, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 370 days.

(21) Appl. No.: 17/545,372

(22) Filed: Dec. 8, 2021

(65) Prior Publication Data

US 2023/0177202 A1 Jun. 8, 2023

(51) Int. Cl.
*G06F 21/62* (2013.01)
*G06F 16/245* (2019.01)

(52) U.S. Cl.
CPC ........ *G06F 21/6227* (2013.01); *G06F 16/245* (2019.01); *G06F 21/6254* (2013.01)

(58) Field of Classification Search
CPC . G06F 16/245; G06F 21/6227; G06F 21/6254
USPC ........................................................ 726/27
See application file for complete search history.

(56) References Cited

U.S. PATENT DOCUMENTS

| 7,818,588 | B2 | 10/2010 | Duri et al. |
| 9,497,170 | B2 | 11/2016 | Akiyama et al. |
| 2011/0276804 | A1* | 11/2011 | Anzai ................ H04L 63/1441 713/168 |
| 2012/0087494 | A1* | 4/2012 | Spalka ................ H04L 9/3066 380/46 |
| 2014/0229055 | A1 | 8/2014 | Itoi et al. |
| 2020/0218729 | A1* | 7/2020 | Ryu ....................... G06F 16/29 |

(Continued)

FOREIGN PATENT DOCUMENTS

| CN | 104753680 A | 7/2015 |
| JP | 6403709 B2 | 10/2018 |
| WO | 2020145589 A1 | 7/2020 |

OTHER PUBLICATIONS

Gusikhin et al., Dynamic Cloud-based Vehicle Apps, in Proceedings of the 4th International Conference on Vehicle Technology and Intelligent Transport Systems, pp. 626-635 (2019) (Year: 2019).*

(Continued)

*Primary Examiner* — David P Zarka
(74) *Attorney, Agent, or Firm* — Joseph Zane; Brooks Kushman P.C.

(57) ABSTRACT

Managing data transfer and privacy via a multi-channel transfer of information is provided. A query is received from a client device, the query indicating an access identifier corresponding to an entity for which data is stored. A consented data pool is accessed to identify a random value corresponding to the access identifier. A hash value is computed using a combination of both the access identifier and the random value. An anonymous data pool of stored data is queried to identify results from the stored data tagged with the hash value. The results are returned to the client device responsive to the query.

14 Claims, 5 Drawing Sheets

(56) References Cited

U.S. PATENT DOCUMENTS

2020/0311357 A1* 10/2020 Rosario .................... H04L 9/32
2021/0019806 A1* 1/2021 Galopo ................. G06F 16/907
2022/0222233 A1* 7/2022 Enuka ................... G06F 16/285

OTHER PUBLICATIONS

Makke et al., Connected Vehicle Prognostics Framework for Dynamic Systems, Proceedings of the Third International Scientific Conference "Intelligent Information Technologies for Industry," pp. 3-15 (2019) (Year: 2019).*

Yang et al., The Effectiveness of Cloud-based Smart in-vehicle Air Quality Management, IEEE, pp. 325-329 (2016) (Year: 2016).*

* cited by examiner

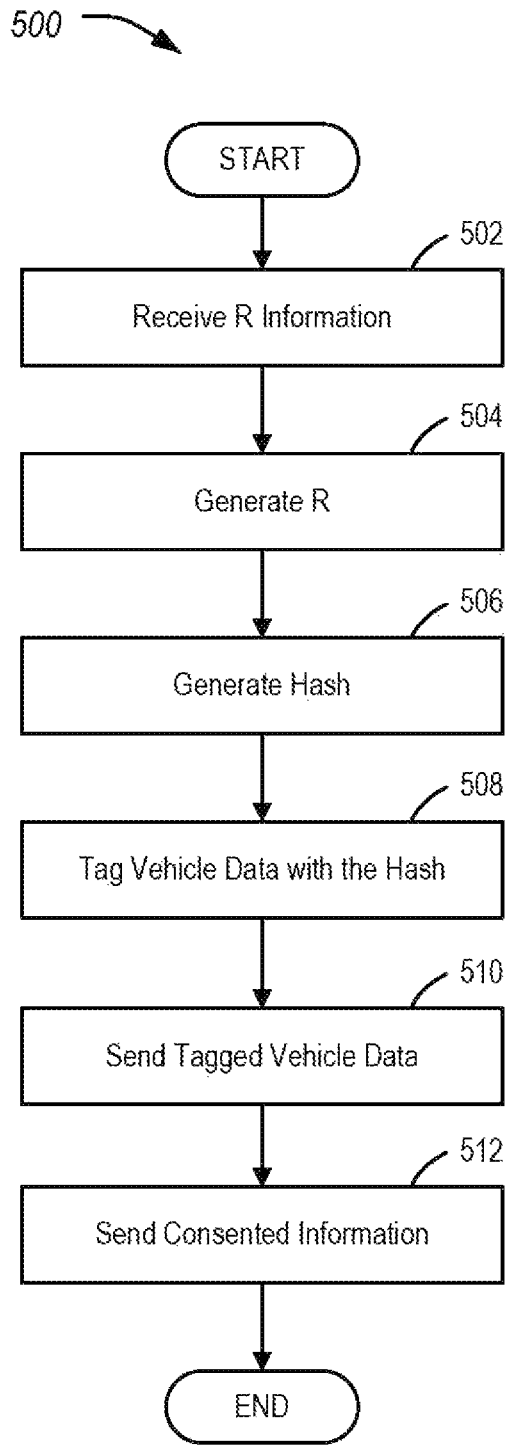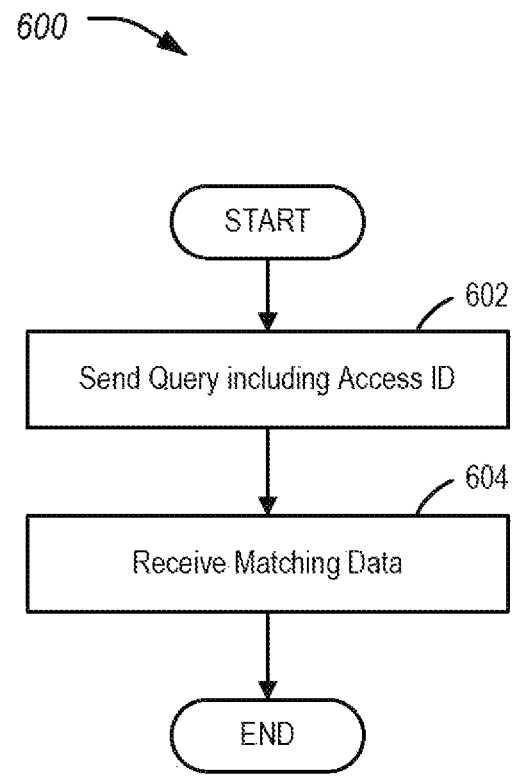
FIG. 5
FIG. 6

PRIVACY AWARE MULTI CHANNEL DATA TRANSFER

TECHNICAL FIELD

Aspects of the disclosure relate to the managing of data transfer and privacy consent levels using multiple channels of communication and privacy constraints.

BACKGROUND

Personally-identifiable information (PII) includes many forms of information that could identify a human being. PII may include textual information such as names, addresses, and birth dates. PII may include other information as well, such as photographs of people, house addresses, or vehicle license plates. Data analytics may require the use of large sets of collected data. These data sets may include PII.

SUMMARY

In one or more illustrative examples, a system for managing data transfer and privacy via a multi-channel transfer of information is provided. The system includes one or more data servers, programmed to receive a query from a client device, the query indicating an access identifier corresponding to an entity for which data is stored; access a consented data pool to identify a random value corresponding to the access identifier; compute a hash value using a combination of both the access identifier and the random value; query an anonymous data pool of stored data to identify results from the stored data tagged with the hash value; and return the results to the client device responsive to the query.

In one or more illustrative examples, a method for managing data transfer and privacy via a multi-channel transfer of information is provided. A query is received from a client device, the query indicating an access identifier corresponding to an entity for which data is stored. A consented data pool is accessed to identify a random value corresponding to the access identifier. A hash value is computed using a combination of both the access identifier and the random value. An anonymous data pool of stored data is queried to identify results from the stored data tagged with the hash value. The results are returned to the client device responsive to the query.

In one or more illustrative examples, a non-transitory computer-readable medium comprising for managing data transfer and privacy via a multi-channel transfer of information that, when executed by one or more data servers, cause the one or more data servers to perform operations including to receive a query from a client device, the query indicating an access identifier corresponding to an entity for which data is stored; access a consented data pool to identify a random value corresponding to the access identifier; compute a hash value using a combination of both the access identifier and the random value; query an anonymous data pool of stored data to identify results from the stored data tagged with the hash value; and return the results to the client device responsive to the query.

BRIEF DESCRIPTION OF THE DRAWINGS

FIG. 5 illustrates an example process for the vehicle sending vehicle data to the data servers for storage;

FIG. 6 illustrates an example process for querying the data servers for vehicle data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Data may be collected from vehicles or other devices. This data may be collected, anonymized, and transferred to a cloud system. It may be desirable that such data is not tied to the vehicles, the other devices, or users of the vehicles or devices without consent. If a user consents to providing data in exchange for access to certain advanced features, then the anonymous data may be linked to the user via consented data. The user may revoke the consent at any time, and if so, the consented data link to the user should be severed. If consent is not given, the user's identity should not be tracked. Even without the data to link the data to specific users, it may be desirable for some access to be provided to the anonymized data.

A communication channel where anonymous data is sent may be different than channels used for the consented data. The anonymized data may also land in a different server than the consented data. Each server may also have different control mechanisms. Therefore, it is desirable that data residing on the anonymized data server cannot, in itself, be linked to a user via the anonymous data pool. As discussed in detail herein, a multi-channel approach may be used to sending anonymized data and linking the data to a consenting user. This allow for the requirements on the channel transmitting anonymized data to avoid the implementation of stringent rules, as the anonymized data cannot be linked to a user via that channel.

Figure 1:
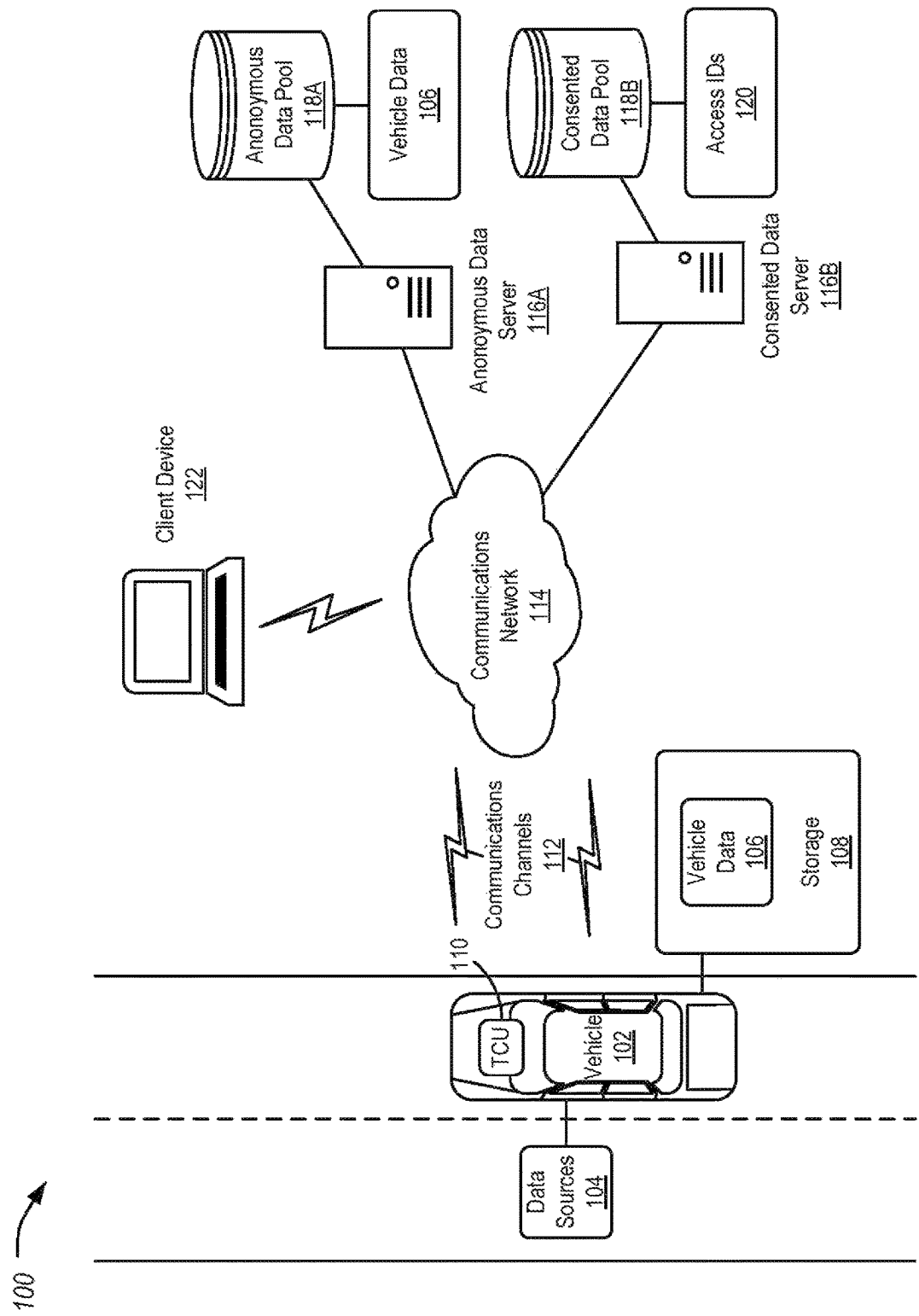
FIG. 1 illustrates an example system for managing data transfer and privacy via a multi-channel transfer of information.

FIG. 1 illustrates an example system 100 for the managing data transfer and privacy via a multi-channel transfer of information. In such a system, a vehicle 102 (or other entity collecting information) may include one or more data sources 104 (such as sensors or other controllers) to capture vehicle data 106 (or other data). The vehicle 102 may include a storage 108 configured to maintain the vehicle data 106. The vehicle 102 may also include a telematics control unit (TCU) 110 configured to communicate via communications channels 112 over a communications network 114 with one or more data servers 116. The data servers 116 may maintain data pools 118 as well as access identifiers (IDs) 120 to link the vehicle data 106 to specific users. A client device 122 may be used to query the data servers 116 for the vehicle data 106. It should be noted that the system 100 is an example, and systems 100 having more, fewer, or different elements may be used. For instance, while a single vehicle 102 and a single client device 122 is shown, it is contemplated that systems 100 could include many vehicles 102 and/or many client devices 122. As another example, while two data servers 116 are shown, it should be noted that implementations may include just one server, or in other cases many servers for load balancing or other networking purposes. As an even further example, while many examples herein relate to vehicles 102 and vehicle data 106, the vehicles 102 may be other types of entities or devices, and the vehicle data 106 may be other types of data unrelated to vehicles 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. The vehicles 102 may be identified by various identifiers, such as vehicle identification numbers (VINs) or globally unique identifiers (GUIDs), as some non-limiting examples.

The data sources 104 may include various devices configured to capture vehicle data 106 of the vehicle 102 environment. In an example, the data sources 104 may include visible light cameras or infrared cameras configured to capture still images and/or video data. In another example, the data sources 104 may include sensors configured to determine three-dimensional (3D) information, such as radar sensors or lidar sensors. The vehicle data 106 may be stored to a database, memory, or other storage 108 of the vehicle 102.

In some instances, the data sources 104 may be configured to capture vehicle data 106 of the surroundings of the vehicle 102. For instance, the data sources 104 may be configured to generate vehicle data 106 of the roadway, of other vehicles 102, of pedestrians, or of obstacles. This vehicle data 106 may be useful for driver assistance system, for autonomous driving systems, for a security camera device, for dash camera applications, and/or for recording driving data for recreation (e.g., track days). However, the capture of such vehicle data 106 may involve the capture of PII. For instance, license plates of other vehicles may be captured in the vehicle data 106. Faces of pedestrians may be captured in the vehicle data 106 as another example.

Some data sources 104 may additionally or alternatively be configured to capture vehicle data 106 vehicle data 106 inside of the vehicle 102, such as of the vehicle 102 cabin. This vehicle data 106 may be useful for applications such as driver awareness verification, vehicle occupancy detection, incident analysis, video conference, or to ensure that infants or belongings are not left behind in the vehicle 102.

The TCU 110 may be configured to provide telematics services to the vehicle 102. These services may include, as some non-limiting possibilities, navigation, turn-by-turn directions, vehicle health reports, local business search, accident reporting, and hands-free calling. The TCU 110 may accordingly be configured to utilize a transceiver to communicate with a communications network 114 over one or more communications channels 112.

The communications network 114 may provide communications services, such as packet-switched network services (e.g., Internet access, voice over Internet Protocol (VoIP) communication services), to devices connected to the communications network 114. An example of a communications network 114 is a cellular telephone network. For instance, the TCU 110 may access the cellular network via connection to one or more cellular towers. To facilitate the communications over the communications network 114, the TCU 110 may be associated with unique device identifiers (e.g., mobile device numbers (MDNs), Internet protocol (IP) addresses, etc.) to identify the communications of the TCU 110 on the communications network 114 as being associated with the vehicle 102.

The data servers 116 may be computing devices configured to communicate with the vehicles 102 over the communications network 114. The data servers 116 may be configured to receive vehicle data 106 from the vehicles 102, as well as in some cases to maintain access IDs 120 that allow the client devices 122 to access identity information corresponding to the vehicle data 106. As a specific example, an anonymous data server 116A may maintain an anonymous data pool 118A. The anonymous data pool 118A may store vehicle data 106 that is anonymous, regardless of whether the user has consented to data collection. A consented data server 116B may maintain a consented data pool 118B of access IDs 120 for accessing identity information of users corresponding to the vehicle data 106 in the consented data pool 118B.

A first communication channel 112A may be used to communicate anonymous vehicle data 106 with the anonymous data server 116A. A second communication channel 112B may be used to communicate consented vehicle data 106 and access IDs 120 with the consented data server 116B.

The access IDs 120 may be identifiers of the entities from which the data is stored. As one non-limiting example, the access IDs 120 may be VINs or GUIDs corresponding to the vehicles 102 providing the vehicle data 106. It should be noted, however, that the access IDs 120 are not limited to VINs or GUIDs and may be any other unique identifier of a vehicle 102 or other device.

The access IDs 120 may be configured to allow users to have access to different levels of information included within the consented data pool 118B. For instance, a first access ID 120 may allow the client device 122 to have access to identity information for a first user but not other users in the consented data pool 118B, while a second access ID 120 may allow the user to have access to identity information for a second user in the consented data pool 118B.

Figure 2:
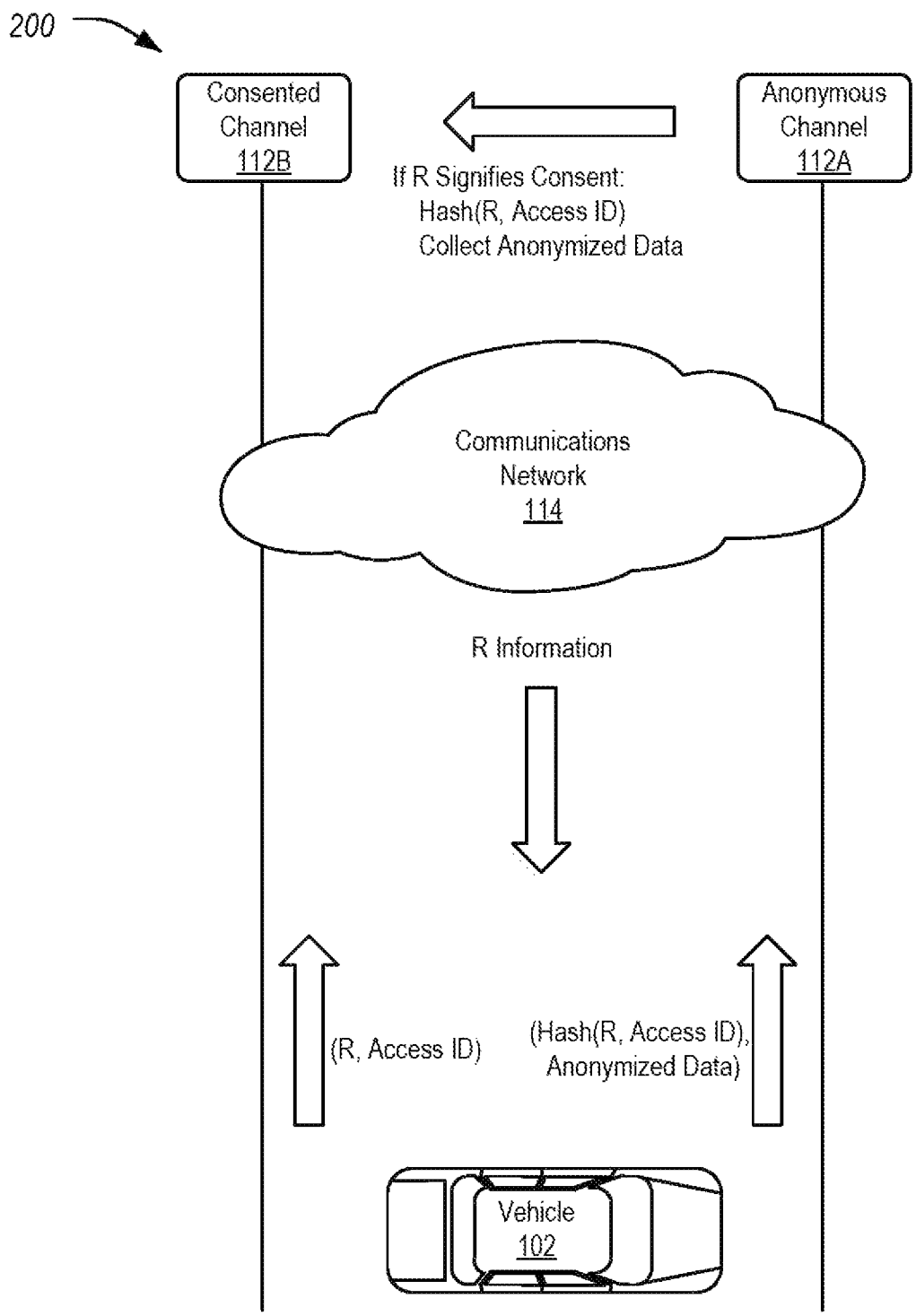
FIG. 2 illustrates an example data flow using two communications channels.

FIG. 2 illustrates an example data flow 200 using two communications channels 112. The first communication channel 112A may be used to send anonymous vehicle data 106 to the anonymous data server 116A. The second communication channel 112B may be used to send user-identifiable vehicle data 106 to the consented data server 116B.

The vehicle 102 may generate a random number (referred to herein as R). The random number R may be a number of length significant enough to make guessing impractical but short enough to allow for efficient data storage, such as 32 bits, 64 bits, 128 bits, 256 bits, etc. The vehicle 102 may generate the value of R responsive to various trigger criteria. For instance, the vehicle 102 may generate a new value for R responsive to the vehicle 102 entering a motive mode where the vehicle 102 is mobile (e.g., ignition on). In other examples, the vehicle 102 may generate a new value for R based on time-specific criteria, such as daily or weekly.

In some examples, the data servers 116 may send information to the vehicle 102 to aid in random number generation at the vehicle 102. This may be done, for example, to ensure the vehicle 102 has adequate entropy to generate a suitably random value for R. To ensure uniqueness of R, in some examples, the data servers 116 may assign the vehicle 102 a set of random numbers R which the data servers 116 determine to be unique to the vehicle 102. In another example, the data servers 116 may provide a seed to be used in in a pseudorandom number generation algorithm on the vehicle 102 to ensure that R is unique to the vehicle 102.

If a user of the vehicle 102 has given consent to data collection, then the vehicle 102 may generate the new value of R. If, however, the user of the vehicle 102 has not given consent (or has revoked consent), then the vehicle 102 may utilize a predefined value of R that signifies no consent. As one example, a value of zero may be used for the purpose of signifying a lack of consent.

The vehicle 102 may be configured to send vehicle data 106 to the data servers 116. Responsive to vehicle data 106 being available to send to the data servers 116, the vehicle 102 may determine whether consent is provided for the sharing of identifiable information of the user. If consent has been provided, then the vehicle data 106 is tagged with a value that provides information with respect to the origin of the data. In one example, this tagged value may be a hash of the random value R and the access ID 120 (e.g., VIN of the vehicle 102, a GUID corresponding to the vehicle 102, etc.). If consent has not been provided, then the vehicle data 106 is tagged with the predefined value of R that signifies no consent (e.g., zero). The hash algorithm may be any of various typically one-way cryptographic hash functions that receive information and generate a data element of generally predefined size. Example hashing algorithms may include, MD5, SHA-1, SHA-2, NTLM, and LANMAN, as some non-limiting possibilities.

Through the first communication channel 112A, the vehicle data 106 and the hash of R and the access ID 120 may be sent to the anonymous data server 116A. Through the second communication channel 112B, the R and the access ID 120 may be sent to the consented data server 116B.

The consented data server 116B, responsive to receiving a R that signifies consent and ID, may compute the hash of R and the access ID 120. This may be the same hash that is executed on the vehicle 102 for tagging of the vehicle data 106 that is sent to the anonymous data server 116A. The consented data server 116B may utilize this hash to query the anonymous data server 116A for matching vehicle data 106.

Thus, while stored to the anonymous data server 116A the vehicle data 106 may remain anonymous. However, if R signifies consent and the access ID 120 is known, then the vehicle data 106 can be linked to a specific user through use of the services of the consented data server 116B. In some examples, if this is the case the vehicle data 106 may be captured by the consented data server 116B for storage in the consented data pool 118B. In other examples, the vehicle data 106 may be pulled from the anonymous data pool 118A as requested by client devices 122 and may not be maintained to the consented data server 116B.

It should be noted that while two communications channels 112 are shown in the data flow 200, in other examples additional communications channels 112 may be used. For instance, different communications channel 112 can their own unique R values. Hence, different communications channels 112 may utilize different hashes for securing different aspects of vehicle data 106. Yet, these different channels may perform consent differently and may be unable to link data among themselves.

If consent is not given, R signifies that lack of consent (e.g., zero). Thus, even if the access ID 120 of the vehicle 102 is tied to R signifying the lack of consent, all vehicles 102 using the data servers 116 that are also non-consenting will also use the same R. In doing so, it may be impossible to link vehicle data 106 to its correct vehicle 102 for vehicle 102 where consent is not given. This is because each vehicle 102 will link to all anonymous vehicle data 106 from all non-consenting vehicles 102.

If consent is given, then R is unique. An analyst having access to the anonymous data server 116A may be able to use the client device 122 to access the anonymous data pool 118A. However, by knowing R alone, the analyst is unable to tie the vehicle data 106 stored in the anonymous data pool 118A with the vehicle 102. Moreover, the value of R tied to the vehicle data 106 may change over time as noted above. Therefore, it is not possible for the analyst to identify which vehicle 102 ties to this vehicle data 106.

However, if the analyst also has access to the consented data server 116B, then the analyst may be able to retrieve the link between R and the Access ID 120. For instance, the analyst may utilize the Access ID 120 to query for the values of R corresponding to the vehicle 102. By using this additional access ID 120 information, the analyst using the client device 122 may be able to generate or retrieve the hash of R and Access ID 120 corresponding to the vehicle 102, and use this value to query the vehicle data 106 for data specific to the vehicle 102 whose access ID 120 is being used.

Moreover, the link between vehicle data 106 and a vehicle 102 may be severed if consent is revoked. For instance, deleting user information may be as simple as setting all vehicle data 106 tagged with a hash of R and the access ID 120 to the value of R signifying a lack of consent. This operation may be performed efficiently by the data servers 116 where once complete, it would no longer be possible anymore to identify the vehicle data 106 of the user.

Figure 3:
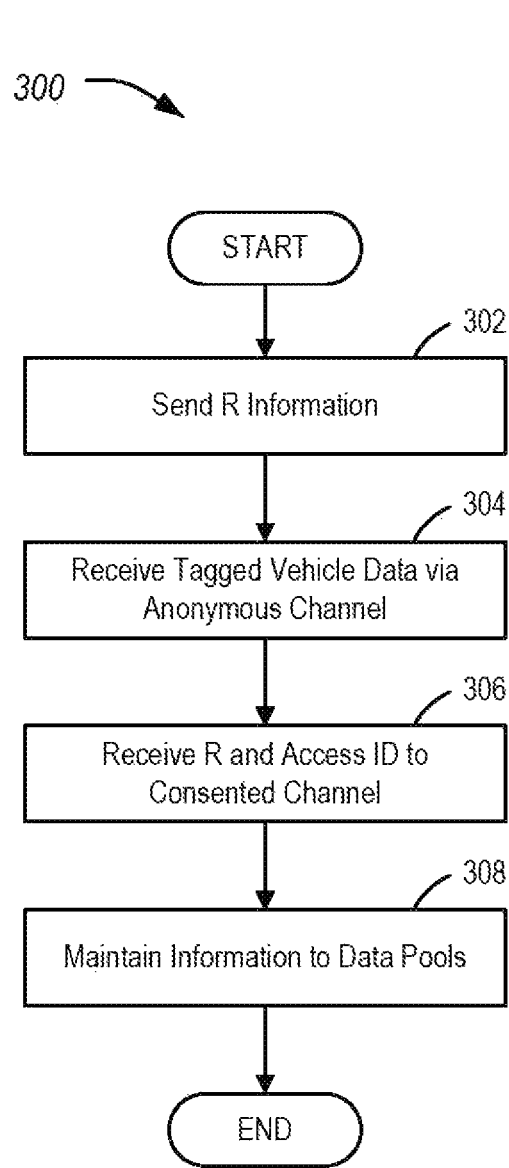
FIG. 3 illustrates an example process for storing vehicle data to the data servers.

FIG. 3 illustrates an example process 300 for storing vehicle data 106 to the data servers 116. In an example, the process 300 may be performed by the anonymous data server 116A and consented data server 116B in the context of the system 100.

At operation 302, the data servers 116 send R information to the vehicle 102. In an example, the R information may include a set of random numbers R which the data servers 116 determine to be unique to the vehicle 102. In another example, the R information may include a seed to be used in in a pseudorandom number generation algorithm on the vehicle 102 to ensure that R is unique to the vehicle 102.

At operation 304, the data servers 116 receive tagged vehicle data 106 from the vehicle 102. In an example, if the vehicle 102 consents to identifiability of the user's information the tagged vehicle data 106 may be tagged by the vehicle 102 with a hash of R and the access ID 120 of the vehicle. If consent is not given, the tagged vehicle data 106 may be tagged by the vehicle 102 with a hash of the value of R signifying a lack of consent and the access ID 120 of the vehicle. Or, if consent is not given, the tagged vehicle data 106 may be tagged by the vehicle 102 with the value of R signifying a lack of consent and no access ID 120. Regardless, this vehicle data 106 may be received over the communications network 114 via the first communication channel 112A to the anonymous data server 116A.

At operation 306, the data servers 116 receive the R and the access ID 120. In an example, if the vehicle 102 consents to identifiability of the user's information, R and the access ID 120 are received over the communications network 114 via the second communication channel 112B to the consented data server 116B.

At operation 308, the data servers 116 maintain the received information. For instance, the information at operation 304 is stored to the anonymous data pool 118A and the information received at operation 306 is stored to the consented data pool 118B. After operation 308, the process 300 ends.

Figure 4:
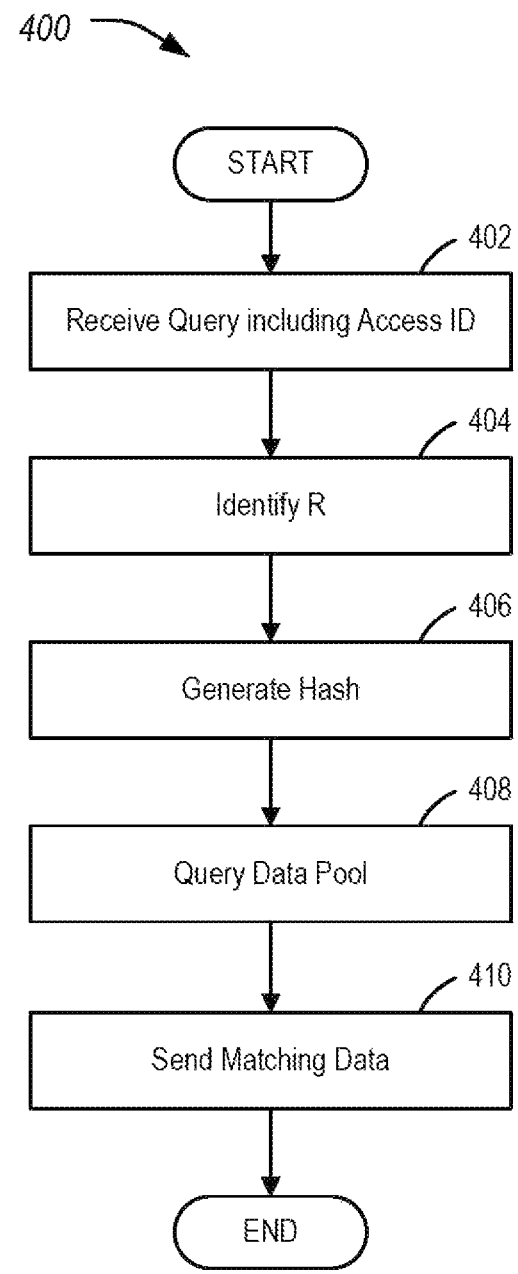
FIG. 4 illustrates an example process for the access of vehicle data from the data servers.

FIG. 4 illustrates an example process 400 for the access of vehicle data 106 from the data servers 116. In an example, the process 400 may also be performed by the anonymous data server 116A and consented data server 116B in the context of the system 100.

At operation 402, the data servers 116 receive a query including the access ID 120 for vehicle data 106. In an example, the data servers 116 may receive the query over the communications network 114 from the client device 122.

At operation 404, the data servers 116 query for R. In an example, the data servers 116 may query the consented data pool 118B for the values of R that correspond to the access ID 120.

At operation 406, the data servers 116 generate a hash of the access ID 120 received at operation 402 and the R queried at operation 404 received at operation 402. In an example, the hash may be a one-way cryptographic hash algorithm such as one of the examples mentioned above.

At operation 408, the data servers 116 queries the data pools 118. In an example, the data servers 116 query the anonymous data pool 118A for the vehicle data 106 tagged with the hash value computed at operation 406.

At operation 410, the data servers 116 return the result of the query at operation 408. In an example, the resultant vehicle data 106 is sent to the client device 122 that sent the request received at operation 402. After operation 410, the process 400 ends.

FIG. 5 illustrates an example process 500 for the vehicle 102 sending vehicle data 106 to the data servers 116 for storage. In an example, the process 500 may be performed by the vehicle 102 in the context of the system 100.

At operation 502, the vehicle 102 receives the R information. In an example, the vehicle 102 may receive the information sent at operation 302 of the process 300.

At operation 504, the vehicle 102 generates R. In an example, the vehicle 102 may choose R from a set of R values received at operation 502. In another example, the vehicle 102 may use a seed received at operation 502 to generate one or more values of R using a pseudorandom number generation algorithm on the vehicle 102.

At operation 506, the vehicle 102 generate a hash of R and the access ID 120 of the vehicle 102. In an example, the access ID 120 may be stored to the vehicle 102 and retrieved, e.g., as communicated over a vehicle bus, stored to a memory of the TCU 110, etc. The hash may be generated using the same approach as done in operation 406 of the process 400.

At operation 508, the vehicle 102 tags vehicle data 106 with the hash generated at operation 506. In one example, the vehicle 102 may apply the hash as metadata to the vehicle data 106.

At operation 510, the vehicle 102 sends the tagged vehicle 102 to the data servers 116. This data may be sent by the TCU 110 of the vehicle 102 to the anonymous data server 116A via the first communication channel 112A over the communications network 114 as discussed at operation 304 of the process 300.

At operation 512, the vehicle 102 sends the consented information to the data servers 116. This information may be sent by the TCU 110 of the vehicle 102 to the consented data server 116B via second communication channel 112B over the communications network 114 as discussed at operation 306 of the process 300. After operation 512, the process 500 ends.

FIG. 6 illustrates an example process 600 for querying the data servers 116 for vehicle data 106. In an example, the process 600 may be performed by the client device 122 of the system 100.

At operation 602, the client device 122 sends a query to the data servers 116. In an example, the query may include an indication of an access ID 120 specified by an analyst accessing the client device 122. The query may be received by the data servers 116 as discussed in operation 402 of the process 400.

At operation 604, the client device 122 receives the result of the query. The query may be sent from the data servers 116 and received to the client device 122 as discussed in operation 410 of the process 400. After operation 604, the process 600 ends.

Figure 7:
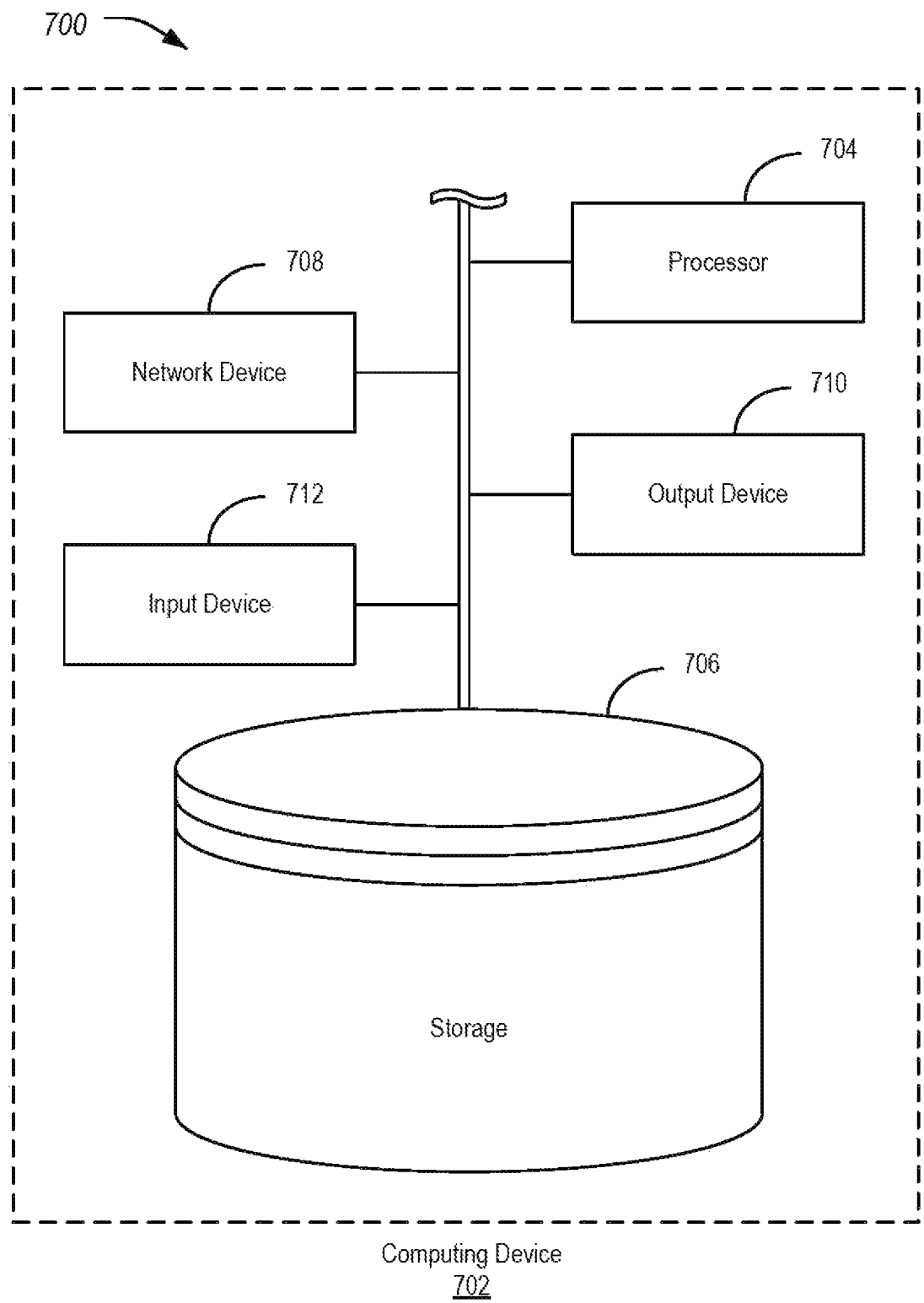
FIG. 7 illustrates an example of a computing device for managing data transfer and privacy via a multi-channel transfer of information.

FIG. 7 illustrates an example 700 of a computing device 702 for managing data transfer and privacy via a multi-channel transfer of information. Referring to FIG. 7, and with reference to FIGS. 1-6, the TCU 110, data servers 116, and client devices 122 may be examples of such computing devices 702. As shown, the computing device 702 includes a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a central processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or Microprocessor without Interlocked Pipeline Stage (MIPS) instruction set families.

Regardless of the specifics, during operation the processor 704 executes stored program instructions that are retrieved from the storage 706. The stored program instructions, accordingly, include software that controls the operation of the processors 704 to perform the operations described herein. The storage 706 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally 3D graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raiseable device that may, in an example, be configured to display braille or another physical output that may be touched to provide information to a user.

The input device 712 may include any of various devices that enable the computing device 702 to receive control input from users. Examples of suitable input devices that receive human interface inputs may include keyboards, mice, trackballs, touchscreens, voice input devices, graphics tablets, and the like.

The network devices 708 may each include any of various devices that enable the TCU 110, data server 116, and client devices 122 to send and/or receive data from external devices over networks. Examples of suitable network devices 708 include an Ethernet interface, a Wi-Fi transceiver, a cellular transceiver, or a BLUETOOTH or BLUETOOTH Low Energy (BLE) transceiver, ultra-wideband (UWB) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for managing data transfer and privacy via a multi-channel transfer of information, comprising:
    one or more data servers, programmed to
        receive a query from a client device, the query indicating an access identifier corresponding to an entity for which data is stored;
        access a consented data pool to identify a random value corresponding to the access identifier;
        compute a hash value using a combination of both the access identifier and the random value;
        receive, via a first communication channel, anonymous data from the entity, the anonymous data being tagged with the hash value of both the access identifier corresponding to the entity and the random value;
        receive, via a second communication channel, the access identifier and the random value;
        maintain the anonymous data in the anonymous data pool;
        maintain the access identifier and the random value in the consented data pool;
        perform the query against the anonymous data pool of the stored data to identify results from the stored data that are tagged with the hash value; and
        return the results to the client device responsive to the query.

2. The system of claim 1, wherein the one or more data servers are further programmed to untag the hash value from the anonymous data pool, such that the anonymous data pool is no longer linked to the access identifier and the random value.

3. The system of claim 1, wherein the one or more data servers are further programmed to send a set of random values to the entity, wherein the random value is one of the set of random values.

4. The system of claim 1, wherein the entity is a vehicle.

5. The system of claim 1, wherein the access identifier is a vehicle identification number (VIN) or a globally unique identifier (GUID).

6. A method for managing data transfer and privacy via a multi-channel transfer of information, comprising:
    receiving a query from a client device, the query indicating an access identifier corresponding to an entity for which data is stored;
    accessing a consented data pool to identify a random value corresponding to the access identifier;
    computing a hash value using a combination of both the access identifier and the random value;
    receiving, via a first communication channel, anonymous data from the entity, the anonymous data being tagged with the hash value of both the access identifier corresponding to the entity and the random value;
    receiving, via a second communication channel, the access identifier and the random value;
    maintaining the anonymous data in the anonymous data pool;
    maintaining the access identifier and the random value in the consented data pool;

performing the query against the anonymous data pool of the stored data to identify results from the stored data that are tagged with the hash value; and returning the results to the client device responsive to the query.

7. The method of claim 6, further comprising untagging the hash value from the anonymous data pool, such that the anonymous data pool is no longer linked to the access identifier and the random value.

8. The method of claim 6, further comprising sending a set of random values to the entity, wherein the random value is one of the set of random values.

9. The method of claim 6, wherein the entity is a vehicle.

10. The method of claim 6, wherein the access identifier is a vehicle identification number (VIN) or a globally unique identifier (GUID).

11. A non-transitory computer-readable medium comprising for managing data transfer and privacy via a multi-channel transfer of information that, when executed by one or more data servers, cause the one or more data servers to perform operations including to:

receive a query from a client device, the query indicating an access identifier corresponding to an entity for which data is stored;

access a consented data pool to identify a random value corresponding to the access identifier;

compute a hash value using a combination of both the access identifier and the random value;

receive, via a first communication channel, anonymous data from the entity, the anonymous data being tagged with the hash value of both the access identifier corresponding to the entity and the random value;

receive, via a second communication channel, the access identifier and the random value;

maintain the anonymous data in the anonymous data pool;

maintain the access identifier and the random value in the consented data pool;

perform the query against the anonymous data pool of the stored data to identify results from the stored data that are tagged with the hash value; and return the results to the client device responsive to the query.

12. The medium of claim 11, further comprising instructions that, when executed by one or more data servers, cause the one or more data servers to perform operations including to untag the hash value from the anonymous data pool, such that the anonymous data pool is no longer linked to the access identifier and the random value.

13. The medium of claim 11, further comprising further comprising instructions that, when executed by one or more data servers, cause the one or more data servers to perform operations including to send a set of random values to the entity, wherein the random value is one of the set of random values.

14. The medium of claim 11, wherein the entity is a vehicle and the access identifier is a vehicle identification number (VIN) or a globally unique identifier (GUID).

* * * * *